OPERATIONAL AMPLIFIER ANALOG LOGIC FUNCTIONS

Filed June 7, 1966

$S_1$ AT 164
$S_2$ AT 158

$S_1$ AT 162
$S_2$ AT 158

$S_1$ AT 166
$S_2$ AT 158

$S_1$ AT 166
$S_2$ AT 160

$S_1$ AT 166
$S_2$ AT 156

INVENTORS
LOUIS M. GUGLIOTTI JR.
JOHN C. WELLS

BY [signature]
ATTORNEY

United States Patent Office 3,471,714
Patented Oct. 7, 1969

3,471,714

OPERATIONAL AMPLIFIER ANALOG LOGIC FUNCTIONS

Louis M. Gugliotti, Jr., and John C. Wells, Tolland, Conn., assignors to United Aircraft Corporation, East Hartford, Conn., a corporation of Delaware Filed June 7, 1966, Ser. No. 555,815
Int. Cl. G06g 7/12
U.S. Cl. 307—230 1 Claim

ABSTRACT OF THE DISCLOSURE

The forward path of a feedback loop connected between the input and the output of an operational amplifier includes a pair of complementary bipolar transistors connected in common emitter follower configuration, said forward path comprising the base-emitter path of both transistors in parallel, the collectors of each transistor being connected to the armature of a related three-position switch. The switch connected to the NPN transistor may be selectively moved to ground, to a positive potential, or to an open terminal; similarly, the switch connected to the PNP transistor may selectively be connected to ground, to a negative potential, or to an open circuited contact. By choosing appropriate combinations between the settings of the two switches, various input-output characteristics may be provided through suitable clamping of the operational amplifier. Either polarity of output may be linear, clamped at zero, or clamped at some potential other than zero; combinations of different output functions for the two polarities may be achieved.

This invention relates to an analog logic circuit. More specifically, it relates to an operational amplifier capable of providing an analog logic function.

Figure 1A:
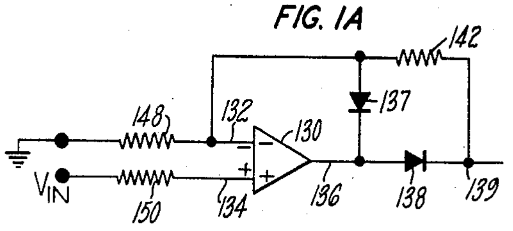
PRIOR ART FIG. 1A

In analog computational devices, logic functions often must be performed to determine, for instance, when one quantity becomes greater than a predetermined value or when two signals differ by a predetermined amount or provide a clamping function wherein the input quantity is effective only within a predetermined range. FIGURE 1*a* shows a prior art analog circuit used to perform a function such as in FIGURE 1*b*.

Figure 1B:
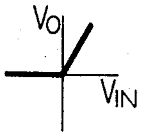

A conventional operational amplifier 130 is provided with a negative and positive input 132 and 134, respectively. The negative input is inverted at the output whereas the positive input is not. The output 136 is connected to the anode of diode 138 to the device output 139 which in turn is fed back through resistor 142 to the negative input 132. A diode 137 has its anode connected to the negative input 132 and its cathode connected to the output 136. The negative input of the operational amplifier is connected to ground through resistor 148. With reference to FIGURE 1*b*, assume that the input signal $V_{in}$ applied to resistor 150 is negative with respect to the zero volt signal applied to 132. In that case the output from the operational amplifier being negative is blocked by the diode 138 which is now reverse biased. As the input signal increases and becomes positive, the diode 138 becomes forward biased and conducts so that the device output 139 thereafter may follow the input along a linear characteristic as shown in FIGURE 1*b*. A noted disadvantage with a circuit of this type is that when diode 138 is reverse biased, the output impedance at the point 139 is extremely high and the output 139 will not be at a predictable value. Voltages from a circuit of this type are likely to cause errors in operational amplifiers connected to this output.

It is therefore an object of this invention to provide a versatile operational amplifier logic circuit presenting a low impedance output at all times.

It is a further object of this invention to provide an operational amplifier circuit which may be used for analog logic switching or linear amplification.

It is still further another object of this invention to provide an operational amplifier clamping circuit with a low output impedance.

Other features and advantages will be apparent from the specification and claims, and from the accompanying drawings which illustrate an embodiment of the invention.

Figure 2:
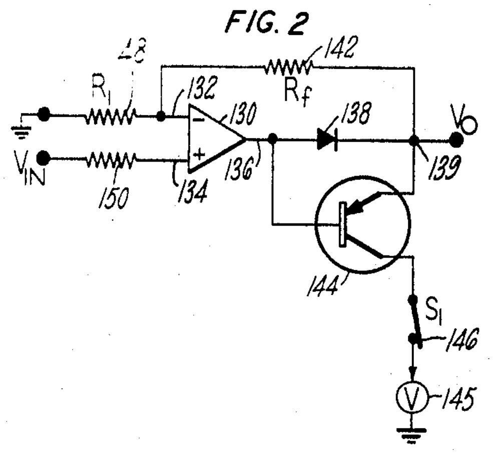

These objects are obtained by a novel circuit as shown in the drawings and the description thereof wherein:

FIGURE 2 shows an operational amplifier employing this invention and accomplishes the same logic function as the prior art circuit in FIGURE 1*a*.

Figure 3A:
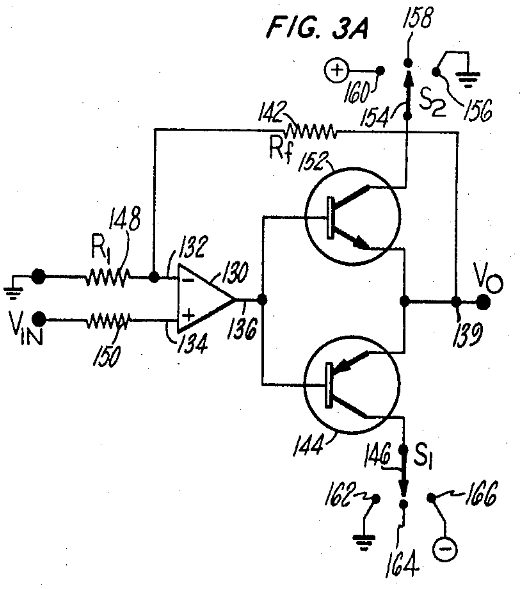

FIGURE 3*a* shows a general embodiment of this invention and some of the general logic functions that may be accomplished therewith.

Similar numbers used in the drawings refer to similar devices and functions therefor. In FIGURE 2, the diode 137 of FIGURE 1*a* has been replaced with a PNP transistor 144 having a base emitter and collector. The base of the transistor 144 is connected to the output 136 of the operational amplifier and the emitter to the output 139 of the circuit. The collector is connected through a switch 146 to a voltage source 145 which in this circuit is at ground potential. It should be realized that switch 146 provides either a high impedance path (open) to the voltage source 145 or a low impedance path (closed) to the voltage source. The high impedance path effectively provides a floating collector potential and the low impedance path effectively biases the collector to the potential of the voltage source. A semiconductor switch may be used to provide a fully electronic operation.

In the operation of FIGURE 2 when $V_{in}$ is negative with respect to the input 132, then the diode 138, is reverse biased, the PNP transistor 144 is turned ON and conducts heavily. Consequently, the output impedance of the circuit in FIGURE 2 is quite low even though diode 138 is reverse biased.

In FIGURE 3 the diode 138 has been replaced with an NPN transistor 152 having a different polarity from that of transistor 144. Transistor 152 has its base connected to the output 136 of the operational amplifier 130, and has its emitter connected to the device output 139 and the emitter of transistor 144. The collector of transistor 152 is shown connected to a switch 154 which may have, in this instance for illustration, three positions. Similarly, the collector of transistor 144 is connected to a three-position switch 146. The switches 146 and 154 may be independently connected to either of three different types of potentials. Switch 146 may be connected to ground through terminal 162, and effectively floating at terminal 164 and to a negative voltage source at terminal 166. The collector of transistor 152 may be connected through switch 154 to either ground terminal 156 or effectively floating at terminal 158 or a positive voltage source at terminal 160. Various analog logic functions may be obtained as shown in the performance illustrations in FIGURES 3*b*, 3*c*, 3*d*, 3*e* and 3*f* depending upon the position of switches 146 and 154.

Figure 3B:
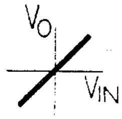

In FIGURE 3*b*, switch 146 is connected to the high impedance or floating terminal 164 and switch 154 connected to a similar terminal 158. In this case the base-to-emitter diodes of transistors 144, 152 allow the output 139 to linearly follow the input of the operational amplifier 130. The response to the circuit is linear for negative and positive input voltages.

Figure 3C:
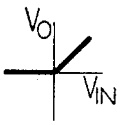

In FIGURE 3*c* the collector of transistor 144 is connected to the ground terminal 162 and the other collector is connected to the high impedance terminal 158. As a result, a similar performance as obtained in FIGURE 2 is obtained whereby below zero volts the input does not produce an output signal from the circuit.

Figure 3D:
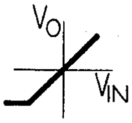

In FIGURE 3*d* the collector of transistor 144 is connected to the negative voltage terminal 166 and the other collector is still connected to the floating terminal 158. In this instance, whenever the output 136 of the operational amplifier falls below the negative potential to which the collector of transistor 144 is connected, the latter conducts so that the output 139 cannot effectively go more negative than the potential at terminal 166. The small voltage drop across the transistor 144, of course, is taken into account.

Figure 3E:
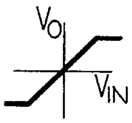

FIGURE 3*e* shows the circuit response when the collector of transistor 144 is connected to the negative terminal 166 and the other collector is connected to the positive terminal 160. In this instance a clamping circuit is obtained wherein $V_{in}$ will not produce an output at 139 more negative than the voltage at terminal 166 and more positive than the voltage at terminal 160. In between, the response of the circuit is linear.

Figure 3F:
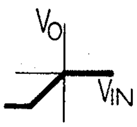

In FIGURE 3*f* the collector of transistor 144 is connected to the negative terminal 166 and the other collector is connected to the ground terminal 156. In this case again a clamping circuit is formed but the positive level of the output is clamped to ground potential.

Other switch arrangements can be obtained and the magnitudes and polarities of the voltage sources at these terminals may be varied as desired. In addition, the inputs to 132 and 134 of the amplifier 130 may be interchanged to obtain a negative output slope characteristic at 139 instead of the positive slope presently shown in FIGURE 3. All of these embodiments are within the scope of this invention.

It is to be understood that the invention is not limited to the specific embodiments herein illustrated and described but may be used in other ways without departure from its spirit as defined by the following claim.

We claim:

1. A function generator operative with respect to a common potential comprising:

an operational amplifier having an input, an output, and a feedback path connected from said output to said input, said feedback path having a forward path;

a pair of complementary bipolar transistors connected in common emitter follower configuration with the base-emitter junctions of said transistors connected in parallel in said forward path;

a pair of potential sources of opposite polarity, each relating to one of said transistors, each source suitable for connection to the collector of the related transistor to permit saturation conduction of said transistor;

a pair of switch means, one for each of said transistors, each of said switches capable of selective operation to connect the collector of the related transistor to the corresponding one of said sources, to said common potential, or to leave said collector unconnected, whereby the output of said operational amplifier may be selectively modified by either polarity thereof being clamped to the potential of the related one of said sources, being clamped to ground, or remaining unclamped, in dependence upon the related switch means being connected to the corresponding source, to ground, or open circuit.

References Cited

UNITED STATES PATENTS

| | | | |
|---|---|---|---|
| 2,789,164 | 4/1957 | Stanley | 330—28 |
| 2,964,656 | 12/1960 | Bissell et al. | 307—313 |
| 3,077,566 | 2/1963 | Vosteen | 330—30 |
| 3,119,029 | 1/1964 | Russell | 307—229 |
| 3,163,829 | 12/1964 | Ladd | 307—313 |
| 3,140,406 | 7/1964 | Thompson | 307—313 |
| 3,166,681 | 1/1965 | Strong | 307—229 |
| 3,303,380 | 2/1967 | Kozikowski | 330—28 |

JOHN S. HEYMAN, Primary Examiner

H. A. DIXON, Assistant Examiner

U.S. Cl. X.R.

307—255